US012606058B2

(12) United States Patent (10) Patent No.: US 12,606,058 B2
Kuromiya et al. (45) Date of Patent: Apr. 21, 2026

(54) SEAT

(71) Applicant: TOYOTA BOSHOKU KABUSHIKI KAISHA, Aichi (JP)

(72) Inventors: Daiki Kuromiya, Toyota (JP); Yuki Nagatani, Kasugai (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 268 days.

(21) Appl. No.: 18/616,737

(22) Filed: Mar. 26, 2024

(65) Prior Publication Data

US 2024/0336166 A1 Oct. 10, 2024

(30) Foreign Application Priority Data

Apr. 10, 2023 (JP) ................................. 2023-063628

(51) Int. Cl.
| | |
|---|---|
| *B60N 2/62* | (2006.01) |
| *A47C 7/02* | (2006.01) |
| *B60N 2/02* | (2006.01) |
| *B60N 2/90* | (2018.01) |

(52) U.S. Cl.
CPC ........ *B60N 2/02* (2013.01); *B60N 2002/0216* (2013.01)

(58) Field of Classification Search
CPC ........ B60N 2/62; B60N 2/68; B60N 2/02253; B60N 2/0284
See application file for complete search history.

(56) References Cited

U.S. PATENT DOCUMENTS

| | | | | |
|---|---|---|---|---|
| 9,630,527 | B2 * | 4/2017 | Matsui ................... | B60N 2/165 |
| 9,688,170 | B2 * | 6/2017 | Wroblewski ............. | B60N 2/22 |
| 9,718,386 | B2 * | 8/2017 | Hayashi .................. | B60R 22/22 |
| 10,081,279 | B2 * | 9/2018 | Line .......................... | B60N 2/58 |
| 10,106,065 | B2 * | 10/2018 | Matsui ................. | B21D 35/001 |
| 10,266,073 | B2 * | 4/2019 | Line .......................... | B60N 2/62 |
| 11,130,432 | B2 * | 9/2021 | Jaranson ................ | B60N 2/914 |
| 2001/0022460 | A1 | 9/2001 | Kondo et al. | |
| 2003/0085601 | A1 * | 5/2003 | Hudswell ............... | B64D 11/06 |
| | | | | 297/312 |
| 2015/0091356 | A1 * | 4/2015 | Ozaki .................... | B60N 2/803 |
| | | | | 297/391 |
| 2015/0258914 | A1 * | 9/2015 | Lee .......................... | B60N 2/62 |
| | | | | 297/284.11 |
| 2015/0307006 | A1 * | 10/2015 | Hayashi ............... | B60N 2/0702 |
| | | | | 297/344.13 |

(Continued)

FOREIGN PATENT DOCUMENTS

JP 2001-219767 A 8/2001

*Primary Examiner* — Shin H Kim
(74) *Attorney, Agent, or Firm* — Greenblum & Bernstein, P.L.C.

(57) ABSTRACT

A seat of the present disclosure that is capable of changing an inclination angle of a front end of a seat cushion includes: a side frame forming a part of a framework of the seat cushion; a tilt arm configured to change the inclination angle; a pivot arm configured to pivotably displace the tilt arm; and a tilt pin rotatably coupling the pivot arm to the side frame. A through hole having the tilt pin inserted therethrough is formed in the side frame, and a falling-out inhibiting member configured to inhibit the tilt pin from falling out of the through hole is fixed to the side frame.

8 Claims, 11 Drawing Sheets

(56)     References Cited

U.S. PATENT DOCUMENTS

| | | | |
|---|---|---|---|
| 2015/0336477 A1* | 11/2015 | Matsui | B60N 2/68 297/344.15 |
| 2017/0291521 A1* | 10/2017 | Line | B60N 2/70 |
| 2018/0079327 A1* | 3/2018 | Kimura | B60N 2/2893 |
| 2018/0215295 A1* | 8/2018 | Onuma | B60N 2/4235 |
| 2021/0170930 A1* | 6/2021 | Jaranson | B60N 2/914 |
| 2023/0086757 A1* | 3/2023 | Toyoshima | B60N 2/0224 297/338 |

* cited by examiner

UP
LEFT
REAR
RIGHT
FRONT
DOWN

SEAT

CROSS-REFERENCE TO RELATED APPLICATIONS

This application claims the benefit of Japanese Patent Application No. 2023-063628 filed on Apr. 10, 2023 with the Japan Patent Office, the entire disclosure of which is incorporated herein by reference.

BACKGROUND

The present disclosure relates to a seat capable of changing an inclination angle of a front end of a seat cushion.

For example, a seat disclosed in Japanese Unexamined Patent Application Publication No. 2001-219767 (hereinafter referred to as Patent Document 1) comprises a mechanism capable of changing an inclination angle of a front end of a seat cushion. In this mechanism, a pin (54) supporting an arm (44) is inserted into an elongated hole (36) from the front side of the elongated hole (36). The numerals between parentheses are referential numerals in Patent Document 1.

SUMMARY

A problem in the invention disclosed in Patent Document 1 is that, when an external force including a force component toward a front side of a seat acts on the pin (54), the pin (54) may fall out of a side frame such as a lower arm.

The present disclosure discloses one example of "a seat capable of changing an inclination angle of a front end of a seat cushion" in which the aforementioned problem has been considered.

Preferably, the seat disclosed in the present disclosure includes at least one of the following elements, for example.

Such elements are: a side frame forming a part of a framework of the seat cushion, the side frame being arranged on one end side of the seat in seat-width directions and extending in front-rear directions of the seat; a tilt arm configured to change an inclination angle of a front end of the seat, the tilt arm extending in the front-rear directions of the seat, a rear end of the tilt arm being pivotably coupled to the side frame; a pivot arm configured to pivotably displace the tilt arm, a front end of the pivot arm being pivotably coupled to a front end of the tilt arm, a rear end of the pivot arm being pivotably coupled to the side frame; and a tilt pin rotatably coupling the pivot arm to the side frame, the tilt pin being arranged anterior to a connecting portion connecting the side frame and the tilt arm, and extending in the seat-width directions.

In addition, it is preferable that a concave or U-shaped through hole is formed in a front end of the side frame, the through hole having the tilt pin inserted therethrough and being recessed rearward from an opening at the front end of the side frame, and that a falling-out inhibiting member is fixed to the side frame, the falling-out inhibiting member being configured to inhibit the tilt pin from falling out of the opening at the front end of the side frame. This can inhibit the tilt pin from falling out of the side frame of the seat.

The seat of the present disclosure may be configured as below, for example.

Preferably, the falling-out inhibiting member faces the tilt pin at least in a 90-degree range of a lower front part of the tilt pin.

This configuration allows the falling-out inhibiting member to function as a reinforcing member that reinforces a part located below the through hole. Thus, even when an external force including the force component toward the front side and a force component toward a bottom side of the seat acts on the tilt pin, a deformation of the side frame can be inhibited. Moreover, the falling-out of the tilt pin can be inhibited.

Preferably, the falling-out inhibiting member comprises a plate portion substantially parallel to a side surface of the side frame and a flange portion extending in a direction intersecting the plate portion, and an end surface of the plate portion faces the tilt pin.

This configuration increases the rigidity of the falling-out inhibiting member, so that the deformation of the side frame can be inhibited. Moreover, the falling-out of the tilt pin can be reliably inhibited.

Preferably, the tilt pin comprises a bar-shaped shaft portion, and a flange portion provided on one end side in an axial direction of the shaft portion, and a gap sized to allow the plate portion to fit in is provided between the flange portion and the side surface of the side frame.

With this configuration, even when a large external force acts on the tilt pin, and then the seat cushion deforms so that the pivot arm is displaced toward the center of the seat in the seat-width directions, the plate portion fits in the gap. Thus, the pivot arm coupled to the tilt pin can be inhibited from being significantly displaced toward the center of the seat in the seat-width directions.

BRIEF DESCRIPTION OF THE DRAWINGS

Embodiments of the present disclosure will be described hereinafter with reference to the accompanying drawings, in which.

DETAILED DESCRIPTION OF EXEMPLARY EMBODIMENTS

Figure 1:
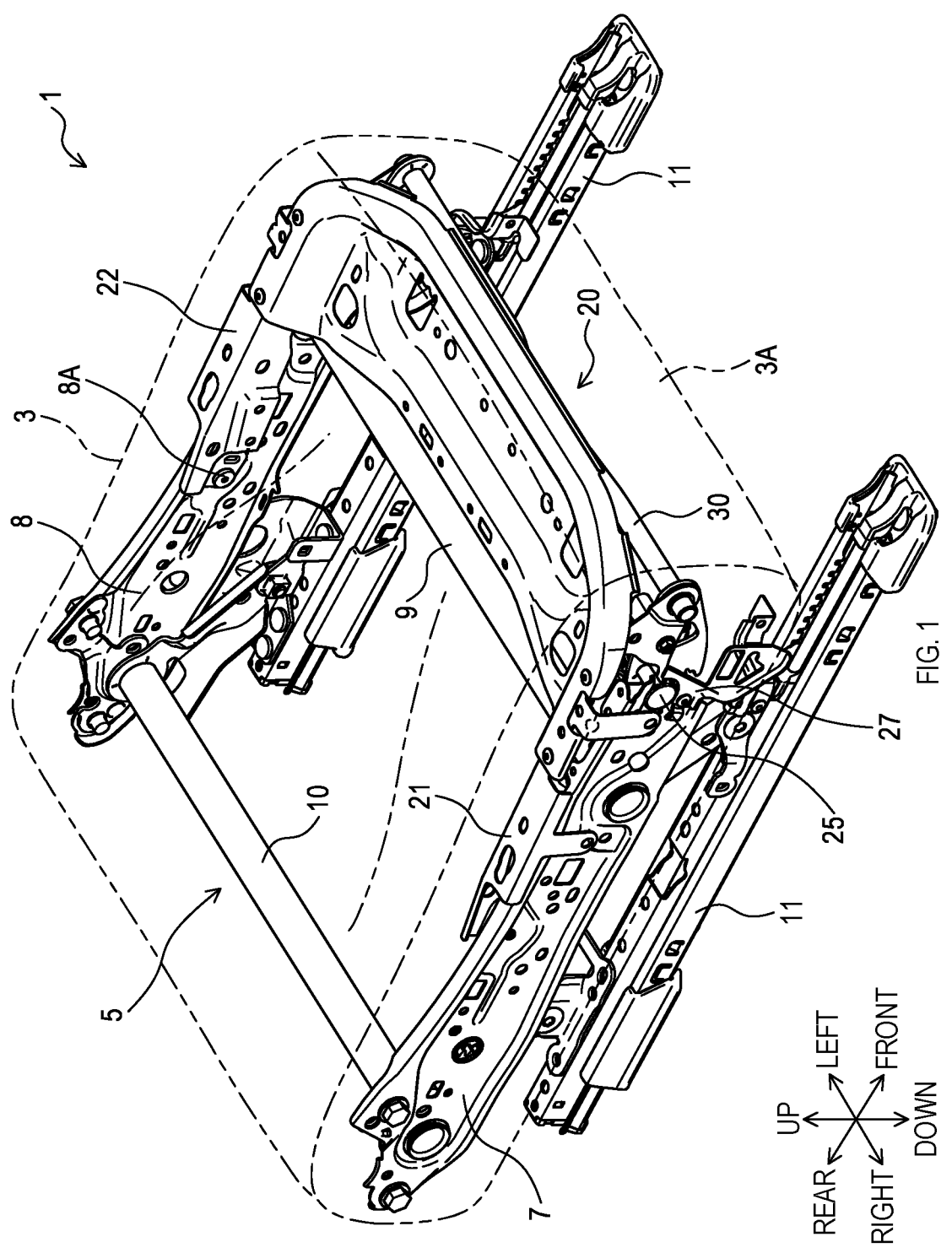
FIG. 1 shows a vehicle seat of an embodiment.

Examples of embodiments that fall within the technical scope of the present disclosure are shown below. Matters to specify the invention or the like recited in the claim are not limited to any specific configuration, structure, or the like described in the following embodiments.

The present embodiments show examples where a seat of the present disclosure is applied to a seat provided to be assembled to a vehicle, such as a car (hereinafter referred to as "vehicle seat"). Arrows for indicating directions, oblique lines, or the like in each drawing are provided to facilitate understanding of mutual relations between the drawings, and the shapes of members or portions, and the like.

Orientation of the vehicle seat is not limited to how the vehicle seat is oriented in each drawing. The directions in each drawing are provided to show the orientation of the vehicle seat of the present embodiments when it is assembled with a car. A drawing with oblique lines does not necessarily represent a cross-sectional view.

With respect at least to a member or a portion explained with a reference numeral, at least one such member or portion is provided unless it is specified using a term such as "only one". Unless it is specified using a term such as "only one", two or more of such members or portions may be provided. The vehicle seat of the present embodiments includes at least one element, such as a member and a portion explained with a reference numeral, or a structural component shown in the drawings.

First Embodiment

<1. Outline of Vehicle Seat>

As shown in FIG. 1, a vehicle seat 1 comprises a seat cushion 3 and a seatback (not illustrated). The seat cushion 3 is a portion configured to support the buttocks of an occupant. The seatback is a portion configured to support the back of the occupant.

The seat cushion 3 comprises a cushion frame 5 and a cushion pad made of urethane or the like (not illustrated). The cushion frame 5 forms a framework of the seat cushion 3.

Figure 2:
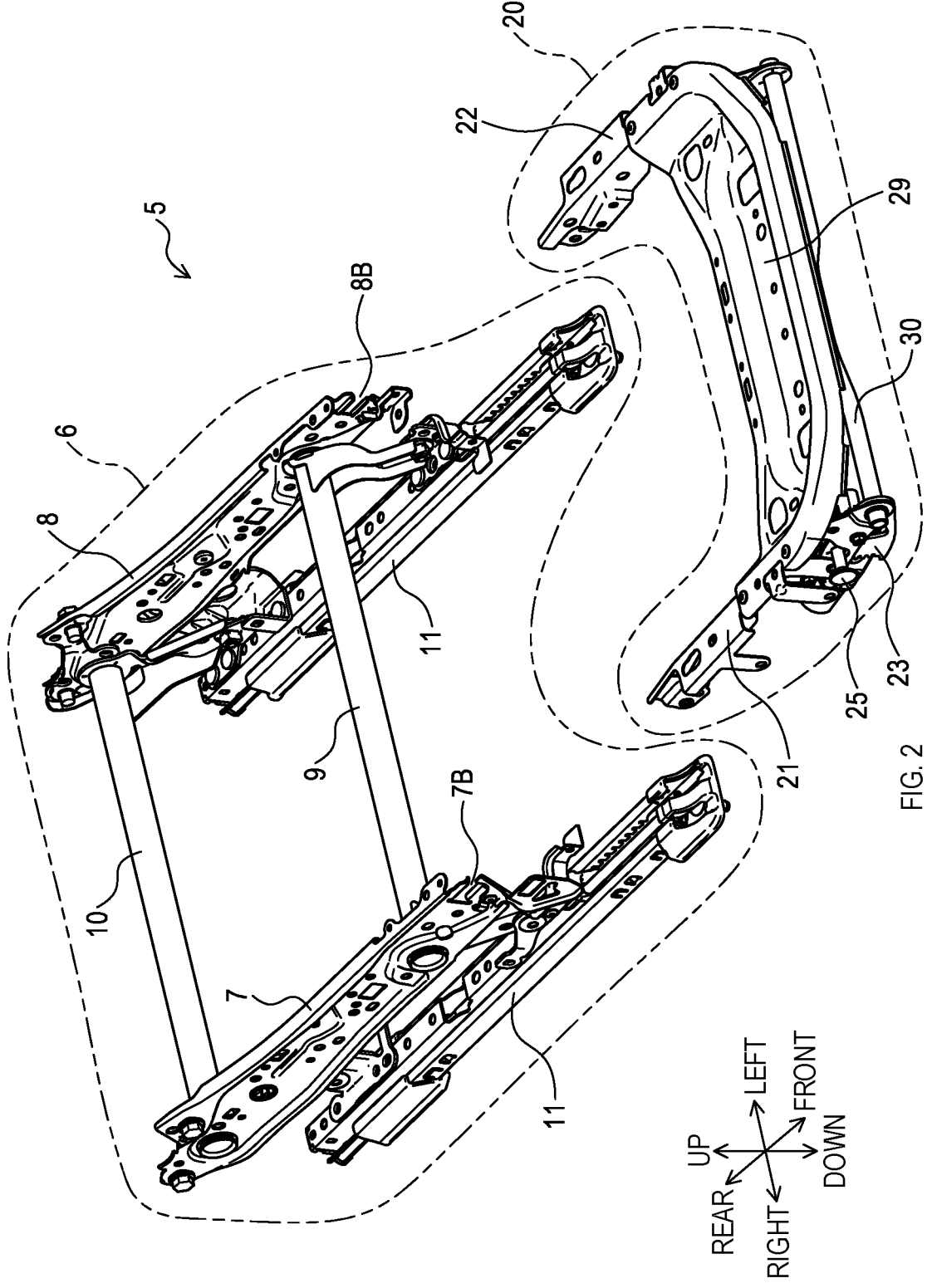
FIG. 2 shows a configuration of a cushion frame.

As shown in FIG. 2, the cushion frame 5 comprises a frame main body 6 and a tilt unit 20. The frame main body 6 is fixed to a vehicle body via two sliding devices 11. The frame main body 6 comprises two side frames 7, 8 and coupling members 9, 10.

The side frame 7 is a reinforcing member arranged on one end side (corresponding to a right end side in FIG. 2) of the cushion frame 5 in seat-width directions and extending in front-rear directions of the seat. The side frame 8 is a reinforcing member arranged on the other end side (corresponding to a left end side in FIG. 2) of the cushion frame 5 in the seat-width directions and extending in the front-rear directions of the seat.

The coupling members 9, 10 extend in the seat-width directions (corresponding to right-left directions in FIG. 2) and connect the side frame 7 and the side frame 8.

The tilt unit 20 is a mechanism configured to make an inclination angle of a front end of the seat cushion 3 changeable. The tilt unit 20 is mounted to a front end of the frame main body 6, in other words, the tilt unit 20 is mounted to front ends of the side frames 7, 8.

<2. Tilt Unit>
<2.1 Configuration of Tilt Unit>

Figure 3:
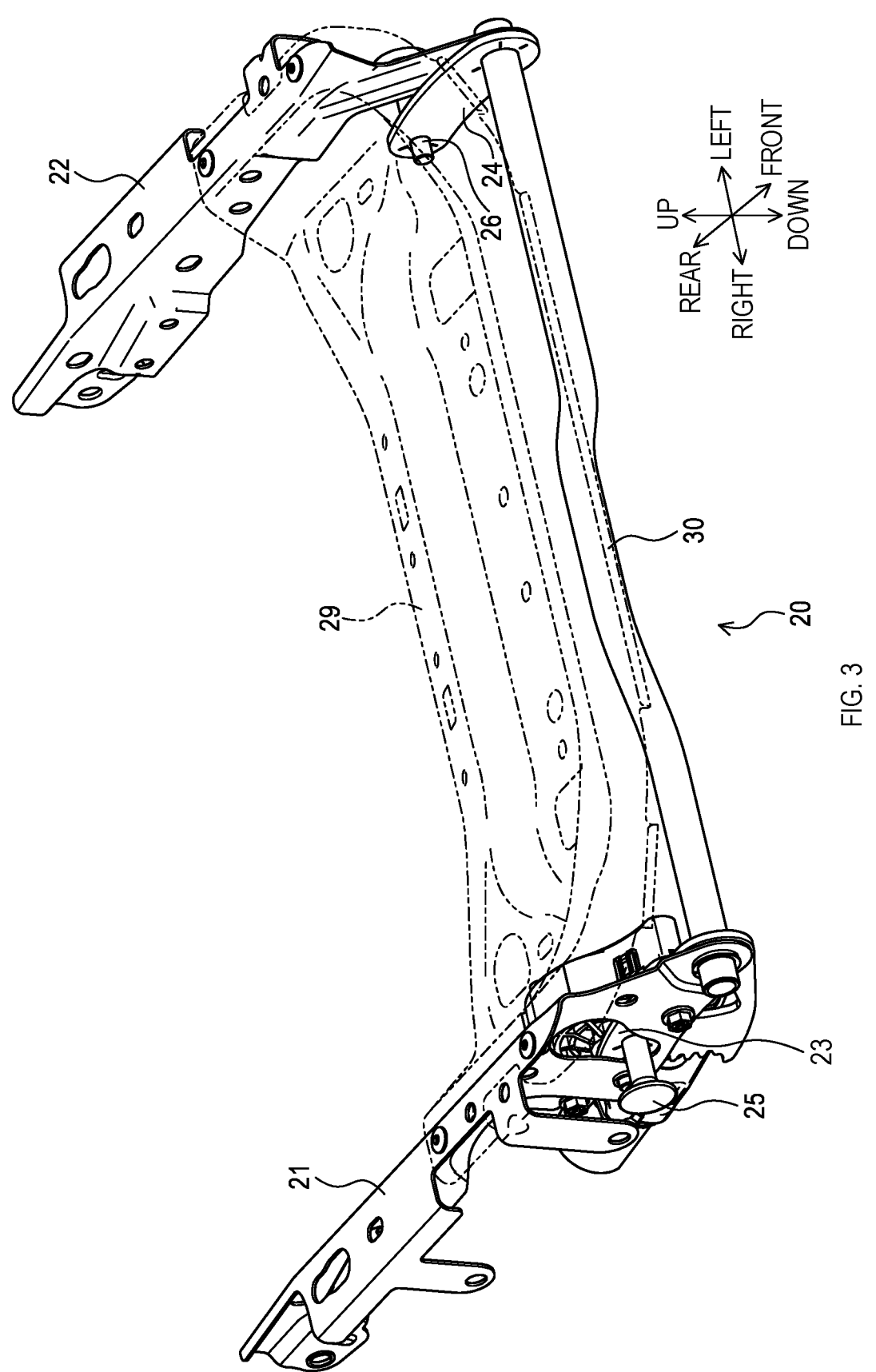
FIG. 3 shows a tilt unit seen from the upper side.
Figure 4:
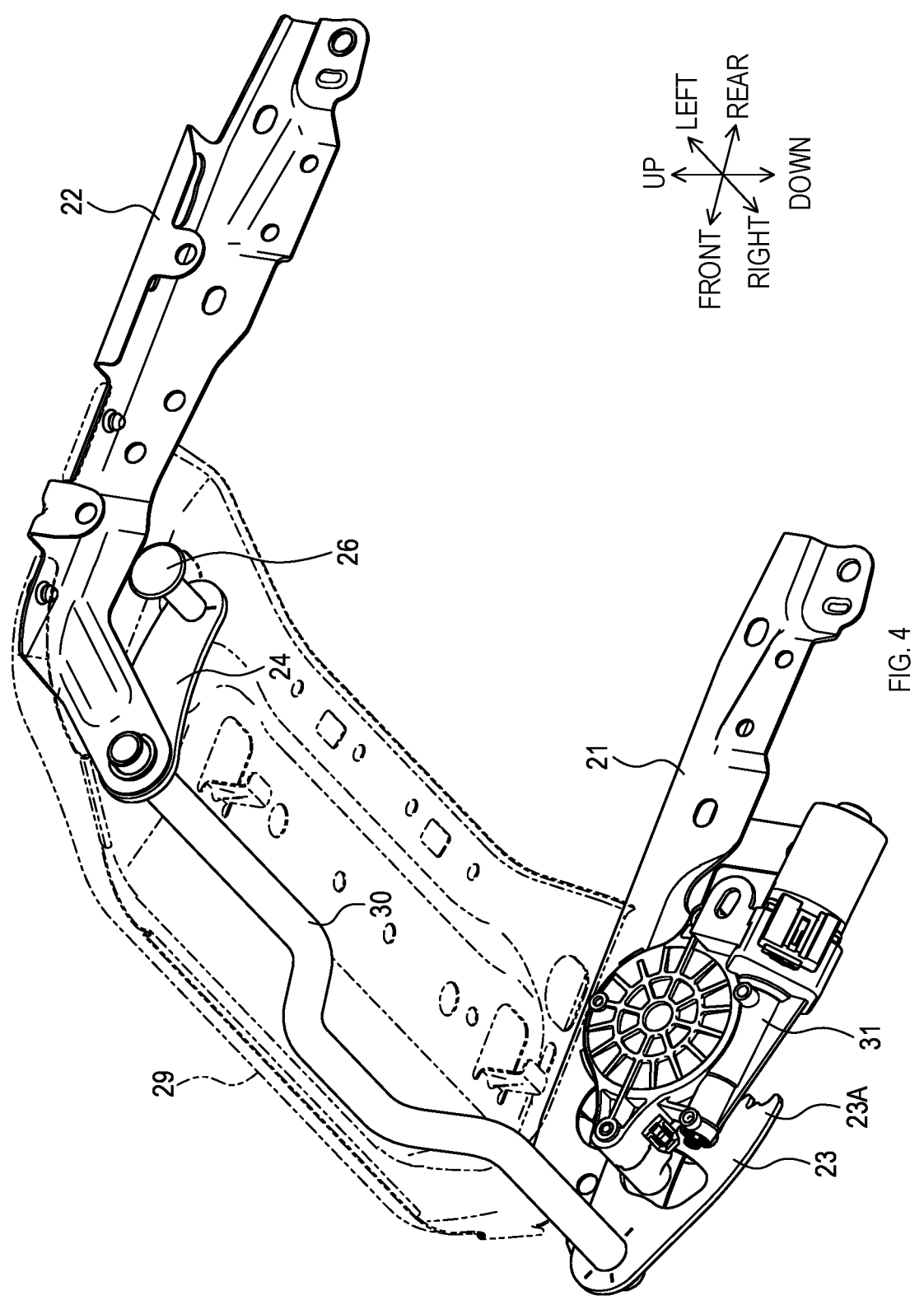
FIG. 4 shows the tilt unit of FIG. 3 seen from the lower side after rotated 180 degrees in an up-down direction.

As shown in FIGS. 3 and 4, the tilt unit 20 comprises tilt arms 21, 22, pivot arms 23, 24, tilt pins 25, 26, a front panel 29, and a coupling member 30.

As shown in FIG. 1, the tilt arm 21 extends in the front-rear directions of the seat, and a rear end of the tilt arm 21 is pivotally coupled to the side frame 7. Likewise, the tilt arm 22 extends in the front-rear directions of the seat, and a rear end of the tilt arm 22 is pivotally coupled to the side frame 8.

When the two tilt arms 21, 22 pivot together relative to the side frames 7, 8, the inclination angle of a seat front end of the seat cushion 3 is changed.

The front panel 29 is a panel-shaped member that bridges front ends of the two tilt arms 21, 22 and forms the seat front end of the seat cushion 3. The front ends of the two tilt arms 21, 22 are also coupled by the coupling member 30, which is pipe-shaped.

As shown in FIG. 4, the pivot arm 23 is a member configured to pivotably displace the tilt arm 21. A front end of the pivot arm 23 is pivotably coupled to the front end of the tilt arm 21. A rear end of the pivot arm 23 is pivotably coupled to the side frame 7.

The pivot arm 24 is a member configured to pivotably displace the tilt arm 22. A front end of the pivot arm 24 is pivotably coupled to the front end of the tilt arm 22. A rear end of the pivot arm 24 is pivotably coupled to the side frame 8.

As shown in FIG. 3, the tilt pin 25 rotatably couples the pivot arm 23 to the side frame 7. The tilt pin 25 is arranged anterior to a connecting portion 7A (see FIG. 5) connecting the side frame 7 and the tilt arm 21, and extends in the seat-width directions.

Figure 5:
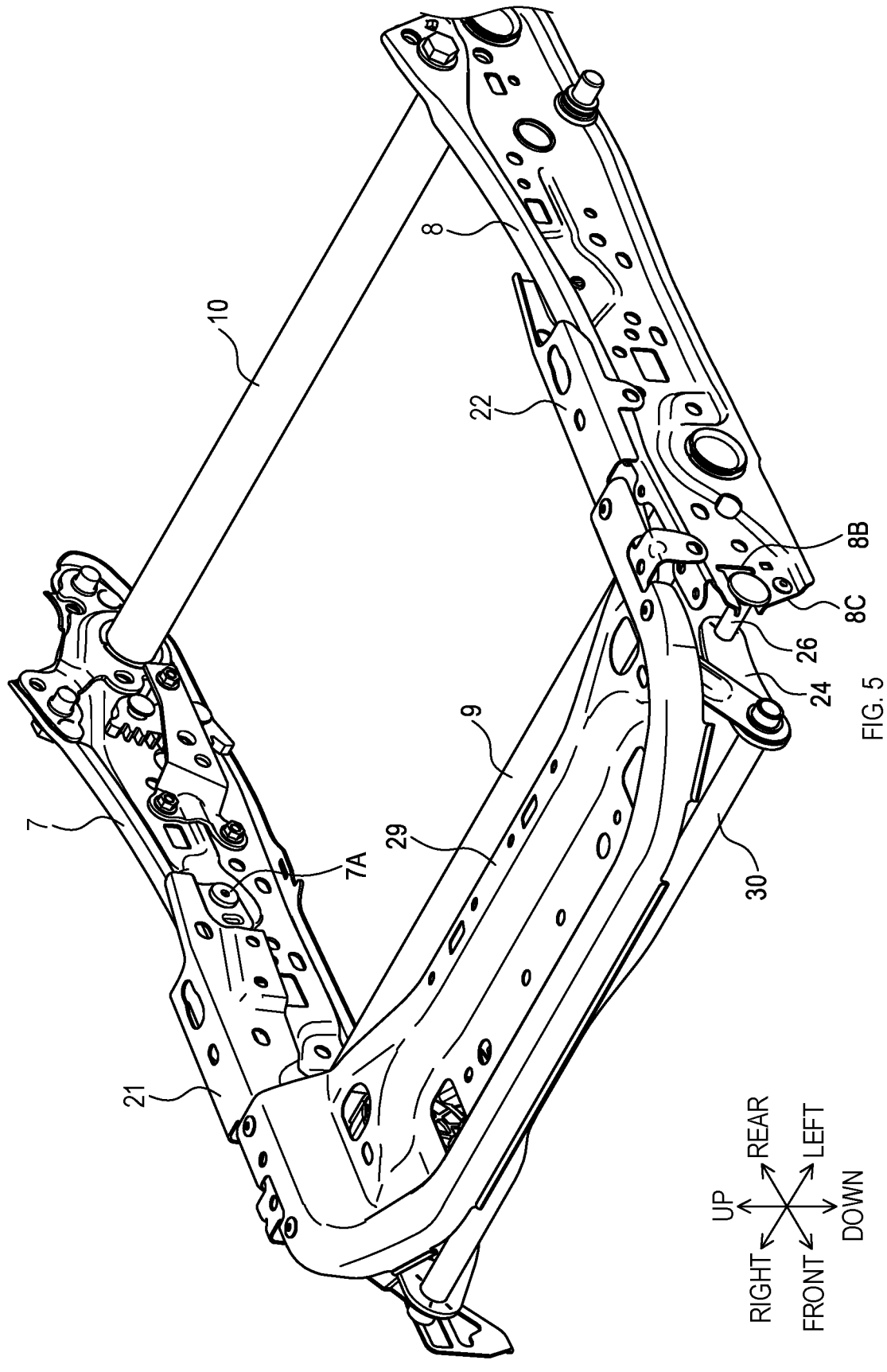
FIG. 5 shows the cushion frame.

As shown in FIG. 5, the tilt pin 26 rotatably couples the pivot arm 24 to the side frame 8. The tilt pin 26 is arranged anterior to a connecting portion 8A (see FIG. 1) connecting the side frame 8 and the tilt arm 22, and extends in the seat-width directions.

Figure 7:
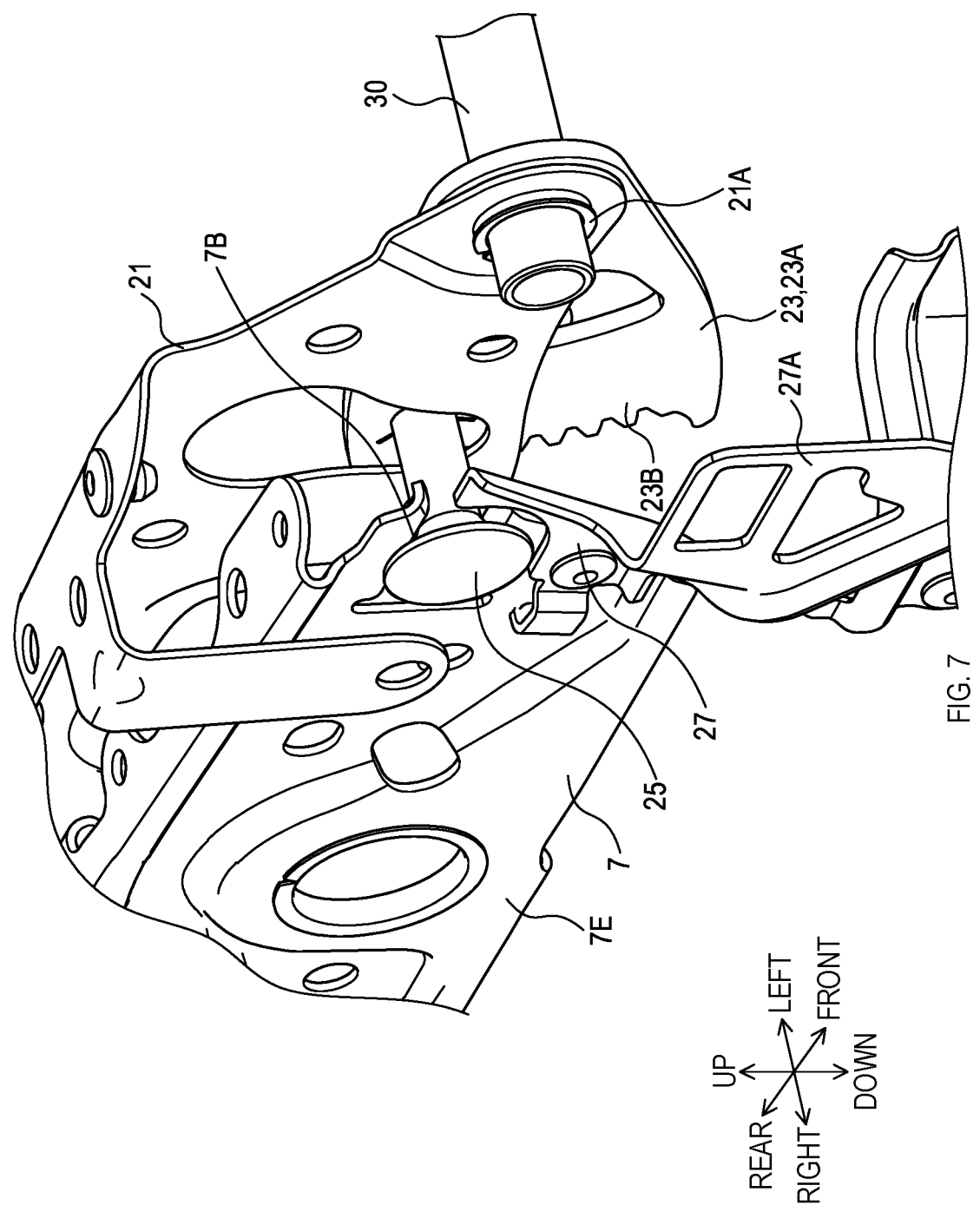
FIG. 7 shows a coupling structure of the side frame and the tilt pin.
Figure 9:
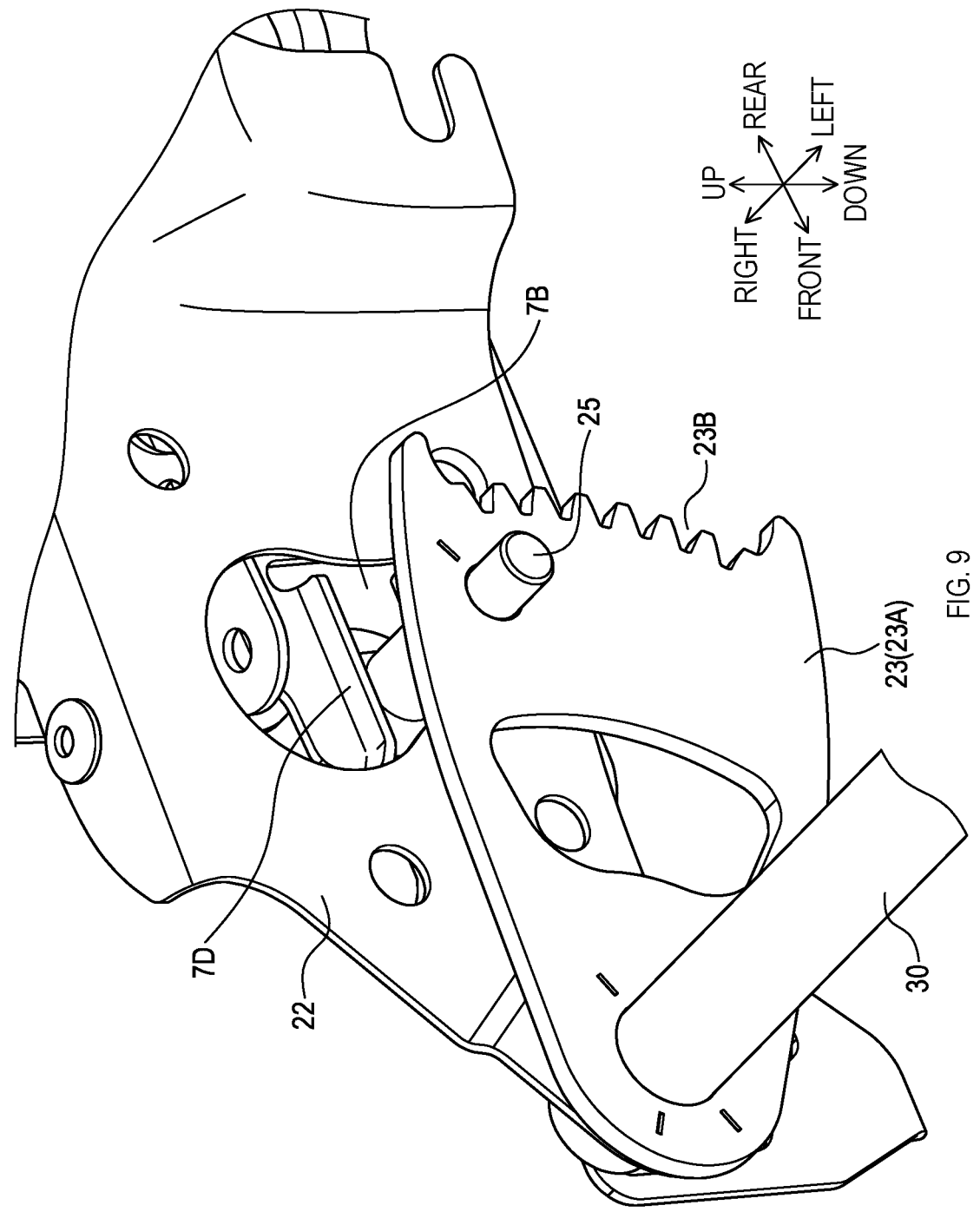
FIG. 9 shows a coupling structure of a pivot arm and the tilt pin.

As shown in FIG. 7, the pivot arm 23 forms a sector gear 23A (in other words, the pivot arm 23 comprises a sector gear 23A). A toothed portion 23B of the sector gear 23A is positioned posterior to the tilt pin 25, as better understood with additional reference to FIG. 9.

As shown in FIG. 4, an electric motor 31 is fixed to the tilt arm 21. The tilt pin 25 is integrated with the sector gear 23A by welding or other process. Accordingly, when the electric motor 31 rotates, the sector gear 23A rotates about the tilt pin 25 relative to the side frame 7. In other words, the pivot arm 23 rotates (or pivots).

When the pivot arm 23 pivots, the pivot arm 24 also pivots together with the pivot arm 23 via the coupling member 30. At this time, since the two tilt arms 21, 22 pivot in conjunction with the pivot arms 23, 24, the inclination angle of the front end of the seat cushion 3 changes.

<2.2 Supporting Structure of Tilt Pin>

Figure 6:
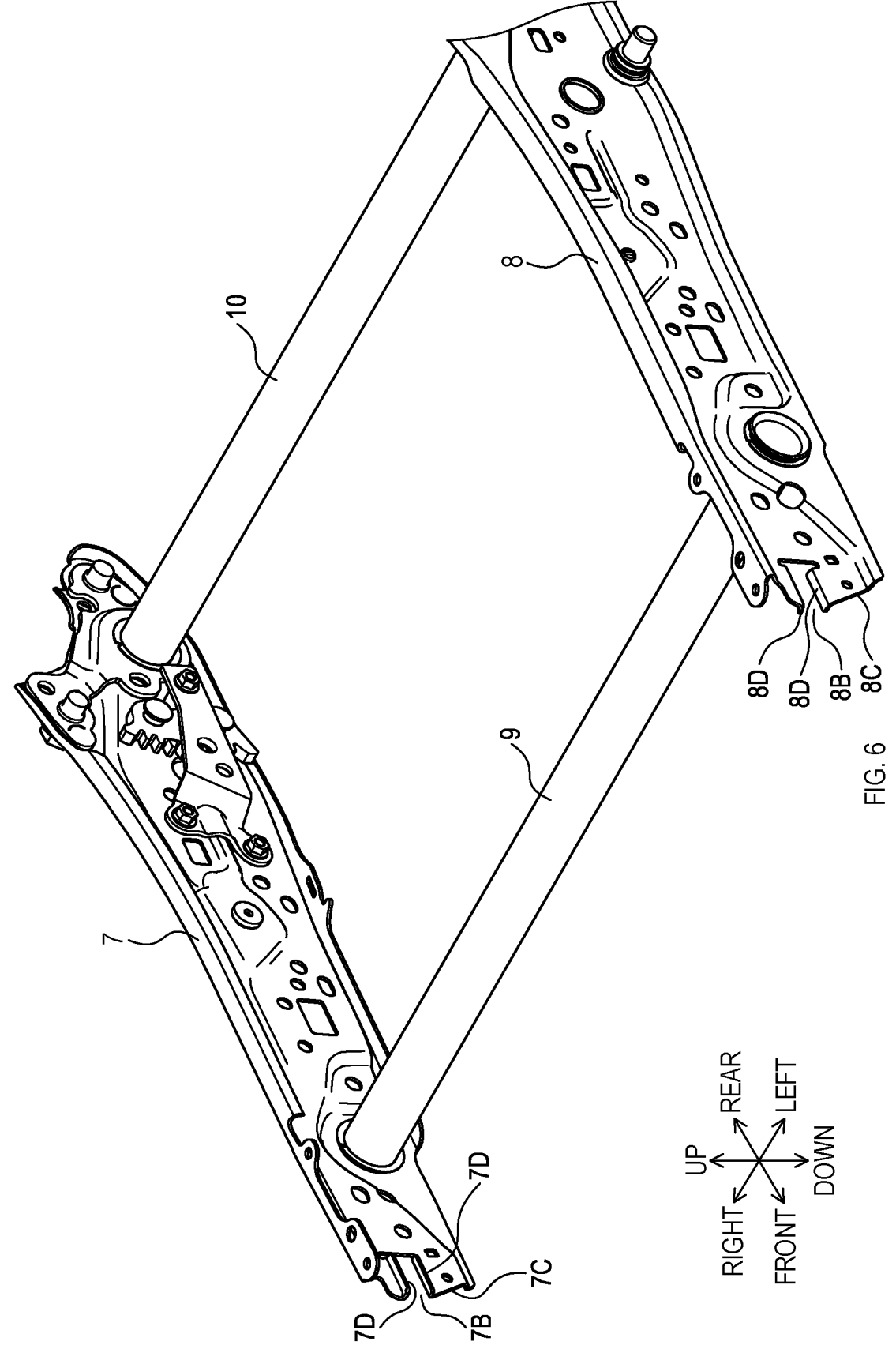
FIG. 6 shows a side frame.

As shown in FIG. 6, a through hole 7B is formed in the front end of the side frame 7. The through hole 7B is a concave or U-shaped through hole recessed rearward from an opening at a front end 7C of the side frame 7. The tilt pin 25 is inserted through the through hole 7B (see FIG. 7).

Like the side frame 7, a through hole 8B is formed in the front end of the side frame 8. The through hole 8B is a concave or U-shaped through hole recessed rearward from an opening at a front end 8C of the side frame 8. The tilt pin 26 is inserted through the through hole 8B (see FIG. 5).

The through holes 7B, 8B of the present embodiment are elongated holes, a major axis direction of which is substantially parallel to an extending direction of the side frames 7, 8. Thus, the tilt pins 25, 26 can each rotate in the respective through holes 7B, 8B while sliding in the major axis direction of the through holes 7B, 8B.

For this reason, in the present embodiment, as shown in FIG. 6, extending portions 7D, 8D are provided in the outer circumferences of the through holes 7B, 8B. The extending portions 7D, 8D extend from the outer circumferences in a direction parallel to an axial direction of the tilt pins 25, 26.

A connecting portion 21A connecting the coupling member 30 and the pivot arm 23 (see FIG. 7), a connecting portion 22A connecting the coupling member 30 and the pivot arm 24 (see FIG. 8), the connecting portion 7A connecting the tilt arm 21 and the side frame 7, and the connecting portion 8A connecting the tilt arm 22 and the side frame 8 can only rotate and cannot slide.

In addition, as shown in FIG. 7, a falling-out inhibiting member 27 is fixed to the side frame 7. The falling-out

Figure 8:
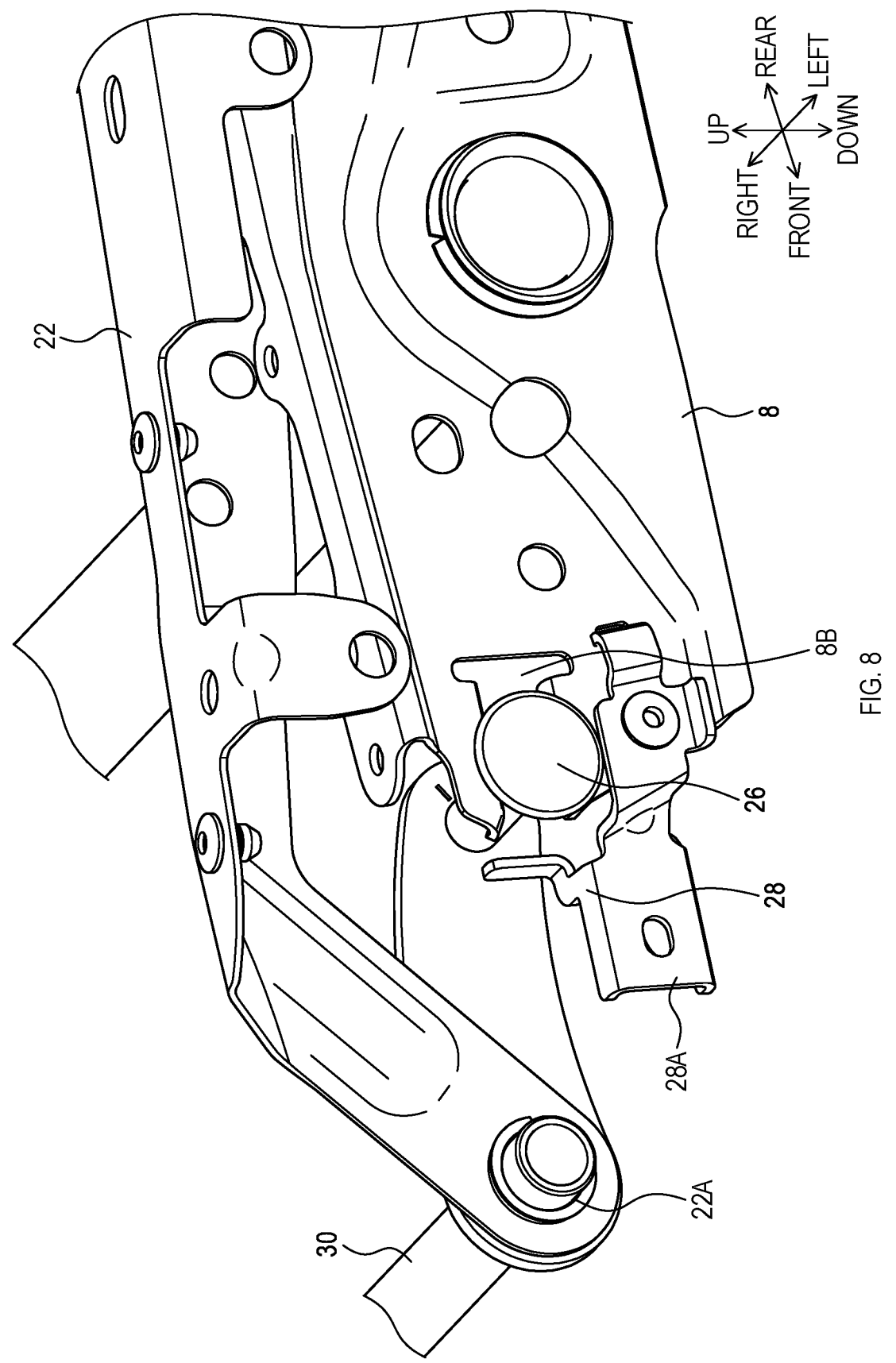
FIG. 8 shows a coupling structure of the side frame and the tilt pin.

5 inhibiting member 27 inhibits the tilt pin 25 from falling out of an opening of the through hole 7B. As shown in FIG. 8, a falling-out inhibiting member 28 is fixed to the side frame 8. The falling-out inhibiting member 28 inhibits the tilt pin 26 from falling out of an opening of the through hole 8B.

The falling-out inhibiting members 27, 28 respectively comprise support portions 27A (see FIG. 7) and 28A (see FIG. 8), both of which support a shield 3A (see FIG. 1). The shield 3A forms a design surface of the front end of the seat cushion 3.

Figure 10:
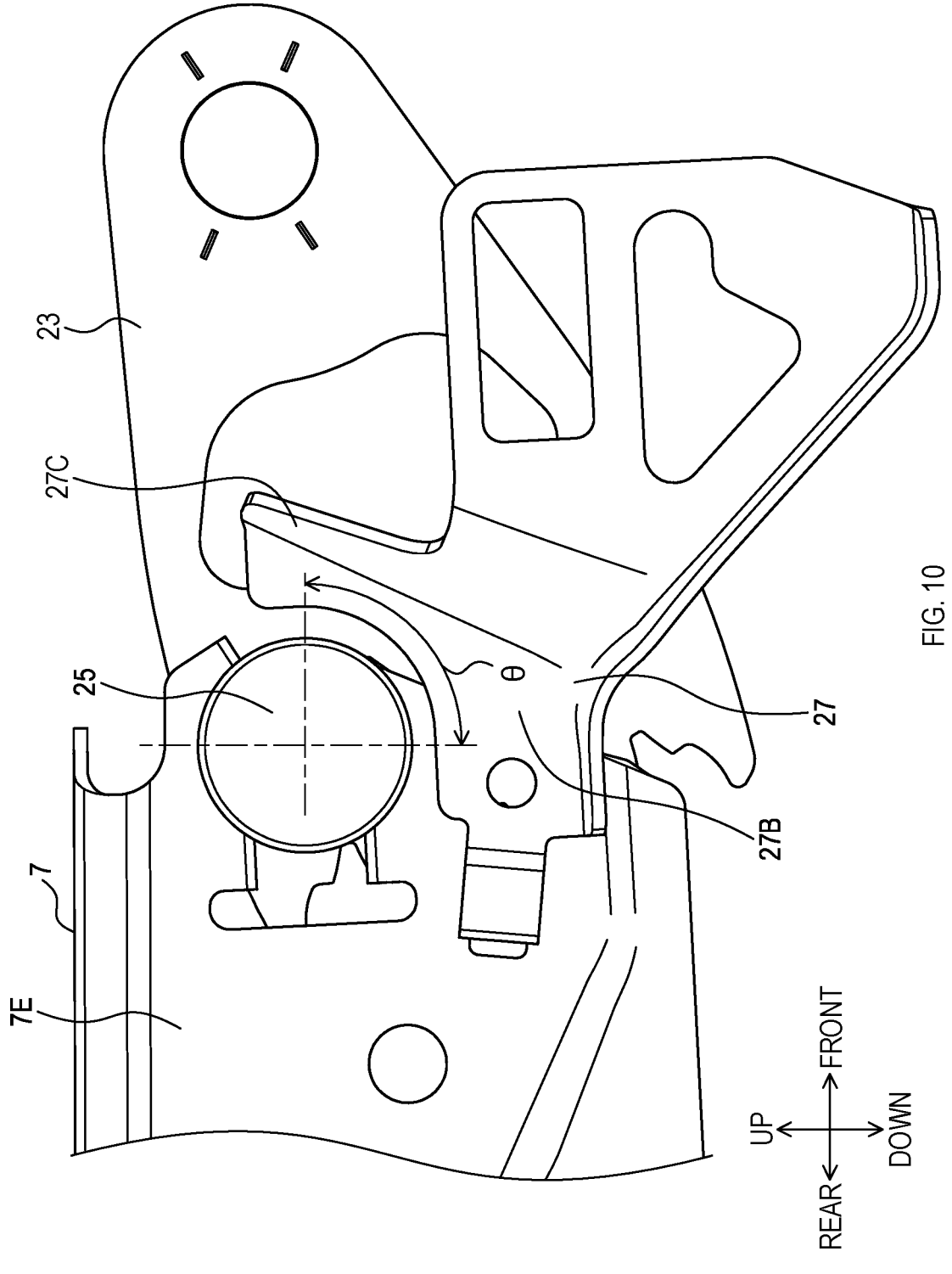
FIG. 10 shows the side frame and a falling-out inhibiting member.
Figure 11:
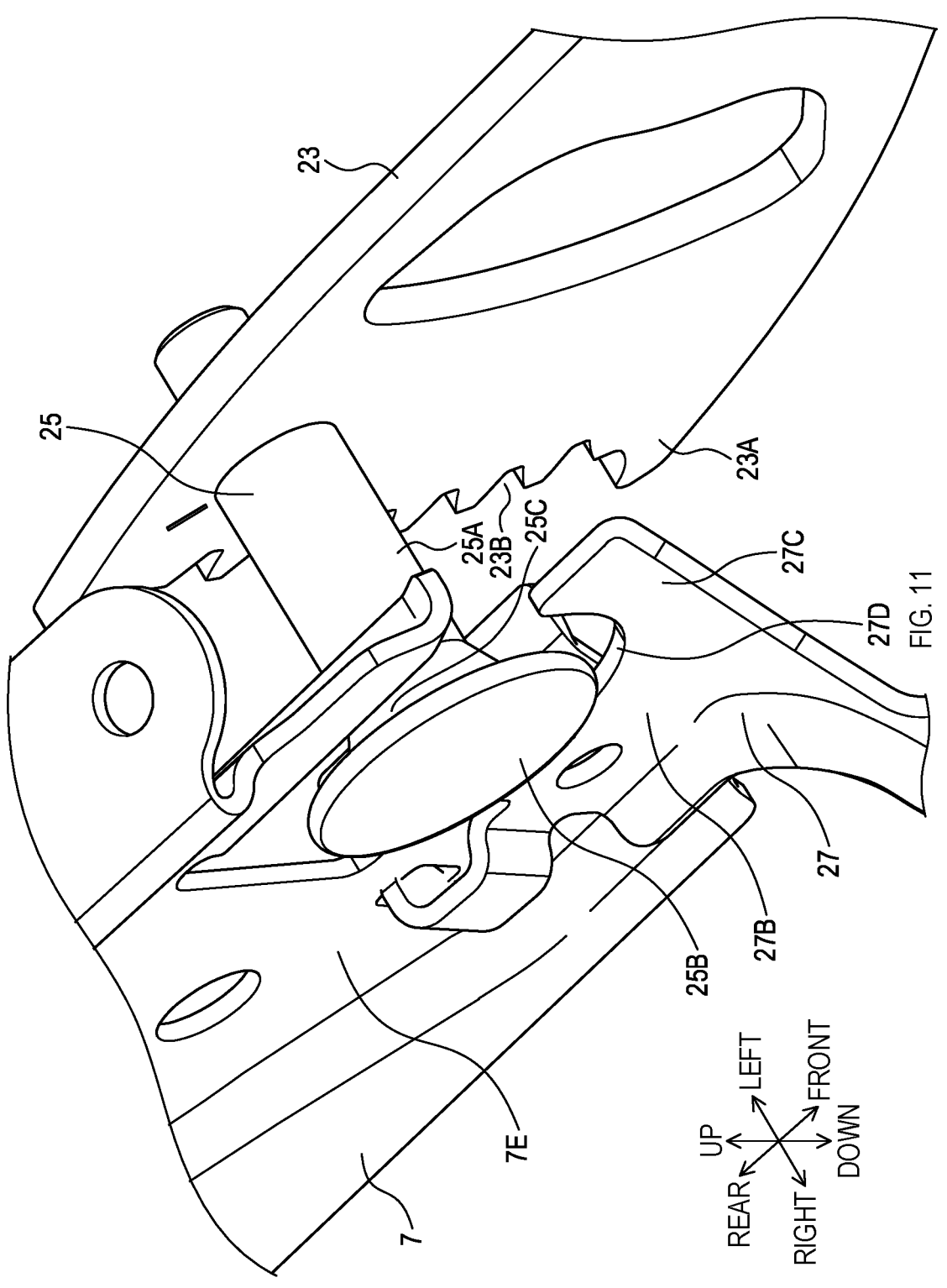
FIG. 11 shows the side frame and the falling-out inhibiting member.

As shown in FIG. 10, the falling-out inhibiting member 27 comprises a plate portion 27B and a flange portion 27C. As shown in FIG. 11, the plate portion 27B is a plate-shaped portion that is substantially parallel to a side surface 7E of the side frame 7.

The flange portion 27C is a wall-shaped portion extending in a direction intersecting the plate portion 27B. An end face 27D of the plate portion 27B faces the tilt pin 25. As shown in FIG. 10, the falling-out inhibiting member 27 also faces the tilt pin 25 at least in a 90-degree range θ of a lower front part of the tilt pin 25.

As shown in FIG. 11, the tilt pin 25 comprises a bar-shaped shaft portion 25A and a flange portion 25B. The flange portion 25B is a flange-shaped portion provided on one end side in an axial direction of the shaft portion 25A. Between the flange portion 25B and the side surface 7E of the side frame 7, a gap 25C sized to allow the plate portion 27B to fit in is provided.

<3. Characteristics of Vehicle Seat of Present Embodiment>

The frame main body 6 and the tilt unit 20 are assembled separately. Then, the tilt unit 20 is mounted to the frame main body 6 to complete the cushion frame 5.

To mount the tilt unit 20 to the frame main body 6, the tilt pins 25, 26 are inserted from the openings at the front ends 7C, 8C into the through holes 7B, 8B, respectively. Then, the falling-out inhibiting members 27, 28 are fixed to the side frames 7, 8, respectively.

In the vehicle seat 1, the falling-out inhibiting members 27, 28 are fixed to the side frames 7, 8 (see FIGS. 7 and 8). This configuration can inhibit the tilt pins 25, 26 from falling out of the side frames 7, 8 in the vehicle seat 1.

The falling-out inhibiting member 27 faces the tilt pin 25 at least in the 90-degree range of the lower front part of the tilt pin 25 (see FIG. 10). Specifically, a part of the side frame 7 located below the through hole 7B is integrated with the falling-out inhibiting member 27.

This configuration allows the falling-out inhibiting member 27 to function as a reinforcing member that reinforces the part located below the through hole 7B. Thus, even when an external force including the force component toward a front side of the seat and a force component toward a bottom side of the seat acts on the tilt pin 25, a deformation of the side frame 7 can be inhibited. Moreover, the falling-out of the tilt pin 25 can be inhibited.

The falling-out inhibiting member 27 comprises the plate portion 27B and the flange portion 27C, and the end face 27D of the plate portion 27B faces the tilt pin 25 (see FIG. 11). This configuration increases the rigidity of the falling-out inhibiting member 27, so that the deformation of the side frame 7 can be inhibited. Moreover, the falling-out of the tilt pin 25 can be reliably inhibited.

Between the flange portion 25B of the tilt pin 25 and the side surface 7E of the side frame 7, there is a gap 25C sized to allow the plate portion 27B to fit in (see FIG. 11). With this configuration, when a large external force acts on the tilt pin 25, and then the seat cushion 3 deforms so that the pivot arm 23 is displaced toward the center of the seat in the seat-width directions, the plate portion 27B fits in the gap 25C.

Accordingly, the falling-out inhibiting member 27 can inhibit the tilt pin 25 from being significantly displaced toward the center of the seat in the seat-width directions. This can also inhibit the pivot arm 23 coupled to the tilt pin 25 from being significantly displaced toward the center of the seat in the seat-width directions.

Other Embodiments

The tilt pins 25, 26 according to the aforementioned embodiment are configured to rotate in the through holes 7B, 8B while sliding in the major axis direction of the through holes 7B, 8B, respectively. However, the present disclosure is not limited thereto.

For example, the connecting portion 21A connecting the coupling member 30 and the pivot arm 23, the connecting portion 22A connecting the coupling member 30 and the pivot arm 24, the connecting portion 7A connecting the tilt arm 21 and the side frame 7, and the connecting portion 8A connecting the tilt arm 22 and the side frame 8 may be configured to slidably rotate. The tilt pins 25, 26 may be configured to only rotate.

The falling-out inhibiting members 27, 28 according to the aforementioned embodiment include the support portions 27A, 28A, respectively, both of which support the shield 3A. However, the present disclosure is not limited thereto. For example, the support portions 27A, 28A may be eliminated.

The falling-out inhibiting member 27 of the aforementioned embodiment faces the tilt pin 25 at least in the 90-degree range of the lower front part of the tilt pin 25. However, the present disclosure is not limited thereto. For example, it is sufficient that the falling-out inhibiting member 27 is positioned to close the opening of the through hole 7B.

In the aforementioned embodiment, the end face 27D of the plate portion 27B of the falling-out inhibiting member 27 faces the tilt pin 25. However, the present disclosure is not limited thereto. For example, a part of the falling-out inhibiting member 27 facing the tilt pin 25 may include a flange portion.

In the aforementioned embodiment, the plate portion 27B can fit in the gap 25C between the flange portion 25B of the tilt pin 25 and the side surface 7E of the side frame 7. However, the present disclosure is not limited thereto. For example, the gap 25C may be eliminated.

In the aforementioned embodiments, the vehicle seat of the present disclosure is applied to a car seat. However, application of the present disclosure should not be limited thereto. The present disclosure may be applied to a seat used in vehicles such as railroad vehicles, ships and boats, and aircrafts, and also to a stationary seat used in theaters and households, for example.

Furthermore, the present disclosure is not limited to the aforementioned embodiments as long as it falls within the spirit of the disclosure described in the above-described embodiments. Accordingly, at least two of the aforementioned embodiments may be combined, or some of the elements shown in the drawings or described with reference to assigned reference numerals in the aforementioned embodiments may be eliminated.

7

What is claimed is:

1. A seat capable of changing an inclination angle of a front end of a seat cushion, the seat comprising:

a side frame forming a part of a framework of the seat cushion, the side frame being arranged on one end side of the seat in seat-width directions and extending in front-rear directions of the seat;

a tilt arm configured to change an inclination angle of a front end of the seat, the tilt arm extending in the front-rear directions of the seat, a rear end of the tilt arm being pivotably coupled to the side frame;

a pivot arm configured to pivotably displace the tilt arm, a front end of the pivot arm being pivotably coupled to a front end of the tilt arm, a rear end of the pivot arm being pivotably coupled to the side frame; and a tilt pin rotatably coupling the pivot arm to the side frame, the tilt pin being arranged anterior to a connecting portion connecting the side frame and the tilt arm, and extending in the seat-width directions, wherein a concave or U-shaped through hole is formed in a front end of the side frame, the through hole having the tilt pin inserted therethrough and being recessed rearward from an opening at the front end of the side frame, and wherein a falling-out inhibiting member is fixed to the side frame, the falling-out inhibiting member being configured to inhibit the tilt pin from falling out of the opening at the front end of the side frame.

2. The seat according to claim 1, wherein the falling-out inhibiting member faces the tilt pin at least in a 90-degree range of a lower front part of the tilt pin.

3. The seat according to claim 2, wherein the falling-out inhibiting member comprises a plate portion substantially parallel to a side surface of the side frame and a flange portion extending in a direction intersecting the plate portion, and wherein an end surface of the plate portion faces the tilt pin.

4. The seat according to claim 3, wherein the tilt pin comprises a bar-shaped shaft portion, and a flange portion provided on one end side in an axial direction of the shaft portion, and wherein a gap sized to allow the plate portion to fit in is provided between the flange portion and the side surface of the side frame.

5. The seat according to claim 1, wherein the pivot arm comprises a sector gear, and wherein a toothed portion of the sector gear is positioned posterior to the tilt pin.

6. The seat according to claim 5, wherein an electric motor configured to cause the sector gear to pivot about the tilt pin is fixed to the tilt arm.

7. The seat according to claim 1, wherein the through hole is an elongated hole, a major axis direction of which is substantially parallel to an extending direction of the side frame.

8. The seat according to claim 1 comprising:

a shield covering a side surface of a cushion frame, wherein the falling-out inhibiting member comprises a support portion that supports the shield.

* * * * *